H. GEARMAN.
AXLE LUBRICATOR.
APPLICATION FILED MAR. 27, 1908.
901,165.
Patented Oct. 13, 1908.
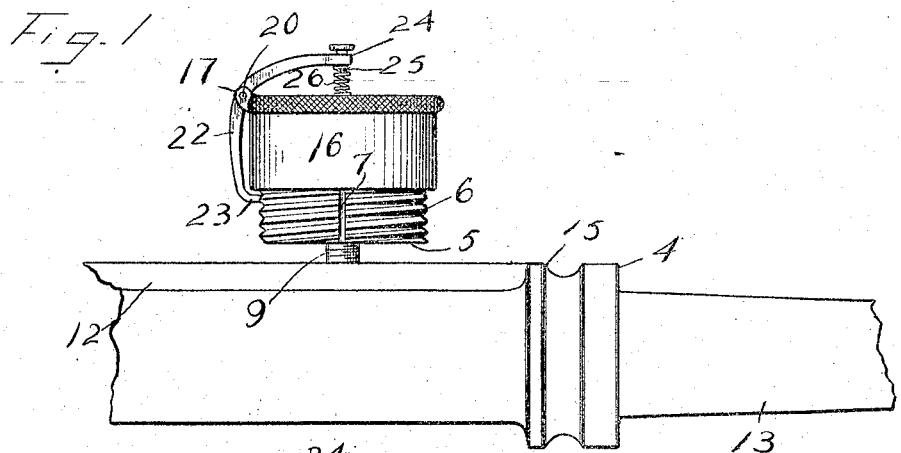
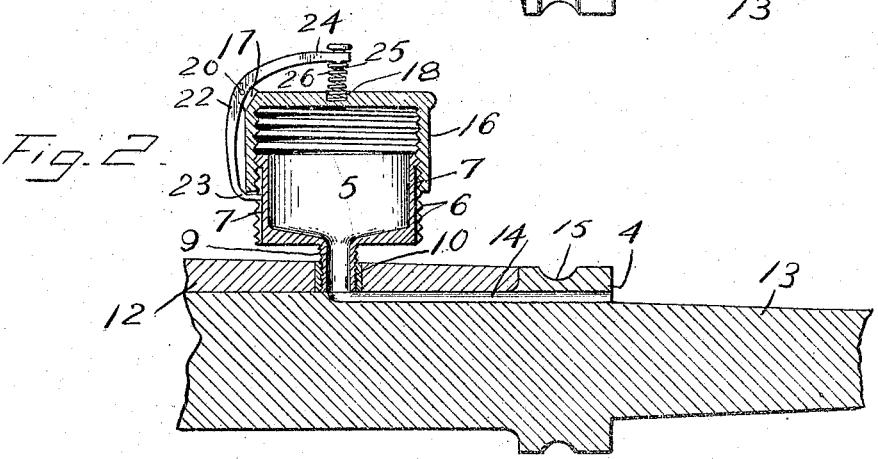
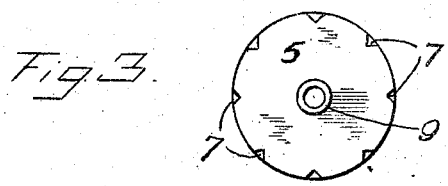
Inventor
Henry Gearman.
Witnesses

UNITED STATES PATENT OFFICE.

HENRY GEARMAN, OF MARIETTA, MINNESOTA.

AXLE-LUBRICATOR.

No. 901,165. Specification of Letters Patent. Patented Oct. 13, 1908.

Application filed March 27, 1908. Serial No. 423,584.

*To all whom it may concern:*

Be it known that I, HENRY GEARMAN, a citizen of the United States, residing at Marietta, in the county of Lac qui Parle, State of Minnesota, have invented certain new and useful Improvements in Axle-Lubricators; and I do hereby declare the following to be a full, clear, and exact description of the invention, such as will enable others skilled in the art to which it appertains to make and use the same.

This invention relates to certain new and useful improvements in axle lubricators.

The object of my invention is to provide a lubricating device adapted to be secured to the axle of a vehicle, so that the cap thereof may be adjustably secured to the cup.

In the accompanying drawings, Figure 1 shows a side elevation of the end of an axle equipped with my lubricating device. Fig. 2 is a longitudinal sectional view with portions broken away, and Fig. 3 a bottom view of the cup.

To provide an oil cup adapted to be secured to a vehicle axle having a cap that may be adjustably secured thereto, is the aim of my invention.

In its operative embodiment, my invention embodies a cup 5 which is exteriorly threaded as shown at 6 and this cup upon the exterior is provided with the longitudinally disposed grooves 7 which however do not extend through the upper edge of the screw thread as shown in Fig. 2. This oil cup is provided with the exteriorly threaded nipple 9 threading into an opening 10 within the axle 12 provided with the spindle 13. This axle 12 is provided with the oil duct 14 passing through the spindle collar 15 as shown.

Working upon the cup 5 is a cap 16 provided with the supporting ear 17 and the socket 18. Pivotally held within the ear 17, by means of the pin 20 is the curved lever 22, the lower end 23 of which is adapted to work within the grooves 7 while the upper end 24 bent approximately at right angles to the major portion 22 terminates above and proximal to the socket 18 and is provided with a stem 25 receiving the spring 26 which at its lower end works within the socket 18 so that this spring is securely held. The spring 26 normally forces the upper ends of this curved lever outward so that the lower end 23 is in spring engagement within one of the slots 7 or is hooked below the lower edge of the oil cup, thereby preventing the oil cap from becoming accidentally displaced from the cup.

As the slots 7 are not carried through the upper end of the cup no air can find ingress into the cup and in rotating the cap 16 the grease within the cup is forced through the grease channel 14. As long as the lower end 23 is within one of the longitudinal slots 7 the cap cannot be removed and in order to accomplish this the upper end of the lever is depressed.

The cup is preferably set at a sloping angle slightly inclining towards the rear and is simple of construction and positive of operation.

And having thus described my said invention what I claim as new and desire to secure by U. S. Letters Patent is—

1. An oil cup exteriorly threaded, and having longitudinally disposed slots, equidistant from one another, an interiorly threaded cap having a supporting ear and a socket, a curved lever pivoted to said ear and having its lower end working upon said slotted threaded cup, the upper end being proximal to said socket, and a spring within said socket, and working against said lever, all arranged as set forth.

2. An oil cup exteriorly threaded, and having longitudinally disposed slots, an interiorly threaded cap having a supporting ear and a socket, a curved lever pivotally connected to said ear having its lower end upon said slotted threaded cup, the upper end being proximal to said socket, and a spring within said socket and working against said lever, as set forth.

In testimony whereof, I affix my signature, in presence of two witnesses.

HENRY GEARMAN.

Witnesses:
 A. C. MILLER,
 G. C. FRANKLIN